United States Patent
Silverman et al.

(10) Patent No.: US 8,331,484 B2
(45) Date of Patent: Dec. 11, 2012

(54) DIGITAL PREDISTORTION TRAINING SYSTEM

(75) Inventors: Matthew A. Silverman, Richfield, OH (US); Paul J. Stager, Akron, OH (US)

(73) Assignee: Cisco Technology, Inc., San Jose, CA (US)

(*) Notice: Subject to any disclaimer, the term of this patent is extended or adjusted under 35 U.S.C. 154(b) by 521 days.

(21) Appl. No.: 12/686,566

(22) Filed: Jan. 13, 2010

(65) Prior Publication Data

US 2011/0170630 A1    Jul. 14, 2011

(51) Int. Cl.
*H04L 25/03* (2006.01)
*H04B 1/04* (2006.01)

(52) U.S. Cl. .................... 375/296; 455/114.3

(58) Field of Classification Search .......... 375/295–297; 455/114.2, 114.3, 115.1
See application file for complete search history.

(56) References Cited

U.S. PATENT DOCUMENTS

| | | | |
|---|---|---|---|
| 5,559,807 A * | 9/1996 | van den Heuvel et al. ... | 370/347 |
| 5,867,065 A * | 2/1999 | Leyendecker ................ | 330/149 |
| 6,141,390 A * | 10/2000 | Cova ............................ | 375/297 |
| 7,085,330 B1 * | 8/2006 | Shirali ......................... | 375/296 |
| 7,924,956 B2 * | 4/2011 | Maltsev et al. ............... | 375/346 |
| 8,170,507 B2 * | 5/2012 | Wang et al. ................. | 455/114.3 |
| 2002/0101937 A1 | 8/2002 | Antonio et al. | |
| 2003/0076894 A1 | 4/2003 | Jin et al. | |
| 2004/0116083 A1 | 6/2004 | Suzuki et al. | |
| 2007/0129027 A1 | 6/2007 | Jin et al. | |

* cited by examiner

*Primary Examiner* — Khanh C Tran
(74) *Attorney, Agent, or Firm* — Edell, Shapiro & Finnan, LLC

(57) ABSTRACT

Techniques are provided herein for training a digital predistortion module in a wireless communication device. At a controller apparatus that is capable of communicating with a plurality of wireless devices, a particular wireless device that requires adjustment of predistortion parameters is identified. The controller also identifies one or more participating wireless devices to participate in a training session during which the particular wireless device makes test transmissions and the one or more participating wireless devices make measurements based on reception of the test transmissions sent by the particular wireless device. The controller apparatus sends commands to the particular wireless device and to the one or more participating wireless devices to initiate the training session. The controller receives measurement data from the one or more participating wireless devices based on reception of the test transmissions from the particular wireless device during the training session. The controller apparatus determines predistortion parameters for use by the particular wireless device based on the measurement data received from the one or more participating wireless devices.

25 Claims, 10 Drawing Sheets

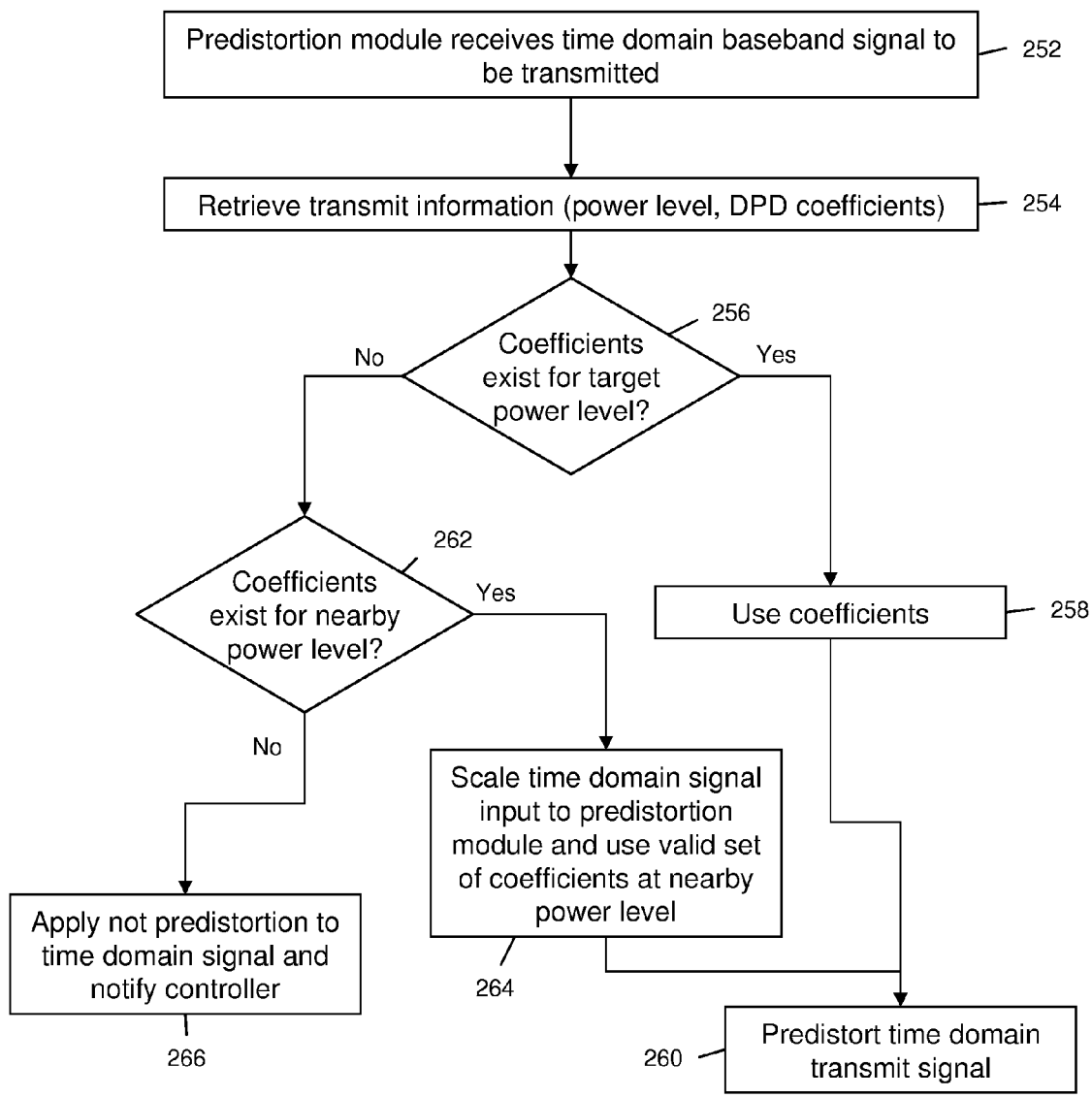

DIGITAL PREDISTORTION TRAINING SYSTEM

TECHNICAL FIELD

The present disclosure relates to wireless communication systems and devices, and more particularly to digital predistortion in a wireless device.

BACKGROUND

Digital predistortion (DPD) is a technique that deliberately distorts a baseband signal prior to upconversion and amplification for wireless transmissions. The distortion applied to the baseband signal is designed to cancel out non-linear distortions caused by the power amplifier in the transmitter of the wireless device.

The predistortion module in the wireless device applies predistortion to the baseband signal according to predistortion coefficients. Thus, the predistortion coefficients used by the predistortion module need to be computed so that the predistortion module properly cancels out the distortion. There is room from improving the techniques by which the predistortion coefficients are determined for use in a wireless device, such as in a wireless network access point device.

BRIEF DESCRIPTION OF THE DRAWINGS

FIG. 11 is a flow chart depicting a process in a access point device to scale a baseband transmit signal prior to predistortion to account for transmit power variations across predistortion parameters.

DESCRIPTION OF EXAMPLE EMBODIMENTS

Overview

Techniques are provided herein for training a digital predistortion module in a wireless communication device. At a controller apparatus that is capable of communicating with a plurality of wireless devices, a particular wireless device that requires adjustment of predistortion parameters is identified. The controller also identifies one or more participating wireless devices to participate in a training session during which the particular wireless device makes test transmissions and the one or more participating wireless devices make measurements based on reception of the test transmissions sent by the particular wireless device. The controller apparatus sends commands to the particular wireless device and to the one or more participating wireless devices to initiate the training session. The controller receives measurement data from the one or more participating wireless devices based on reception of the test transmissions from the particular wireless device during the training session. The controller apparatus determines predistortion parameters for use by the particular wireless device based on the measurement data received from the one or more participating wireless devices.

Example Embodiments

Figure 1:
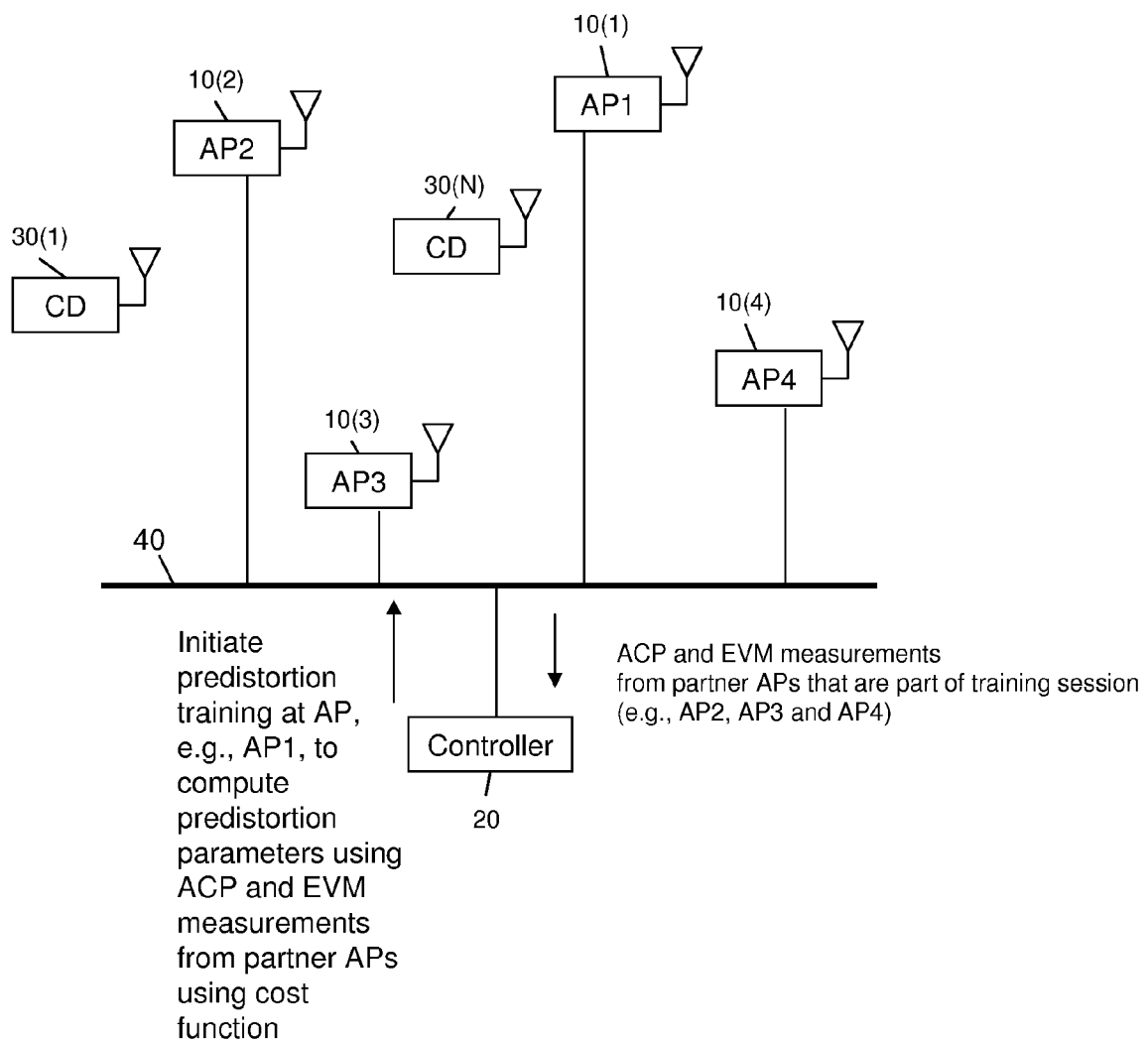
FIG. 1 is a block diagram of a wireless network comprising a plurality of wireless network access point devices and a controller that is configured to initiate predistortion training sessions of an access point device.

Reference is made first to FIG. 1 that shows a wireless network comprising a plurality of wireless network access points (APs) 10(1), 10(2), 10(3) and 10(4), and a controller 20. APs 10(1)-10(4) are configured to serve wireless communications with wireless client devices (CDs) shown at reference numerals 30(1)-30(N). The APs 10(1)-10(4) are, for example, configured to operate in a wireless local area network (WLAN), using the communication standard of IEEE 802.11, known commercially as WiFi™, or in a wireless network that uses the communication standard of IEEE 802.16, known commercially as WiMAX™. While FIG. 1 shows four APs 10(1)-10(4), it should be understood that there may be more or less APs in a given WLAN deployment.

The controller 20 is, for example, a WLAN controller apparatus that is configured to control various functions of the APs 10(1)-10(4), such as the frequency channel used for operation, transmit power, etc. The controller 20 communicates with the APs 10(1)-10(4) via a wired network shown at reference numeral 40. However, it is also possible that the controller 20 is configured with wireless communication capability to communicate with the APs 10(1)-10(4) via a WLAN.

The predistortion training techniques described herein are applicable to any wireless device that has a digital predistortion circuit or module used to predistort a baseband signal prior to its upconversion and amplification for transmission.

As indicated in FIG. 1 and according to the techniques described herein, the controller 20 is configured to initiation predistortion training at a particular AP, e.g., AP1, to compute predistortion parameters adjacent channel power (ACP) measurement data and error vector magnitude (EVM) measurement data received from partner, also called "participating", APs, based on a cost function. Thus, during a training or measurement session, the controller 20 selects one or more participating APs (possibly including the AP that is selected for predistortion training) to make ACP and EVM measurements. For example, when the controller 20 is undergoing a predistortion training session for AP 10(1), the controller 20 may select APs 10(2)-10(4) to be participating APs which participate in the training session by making ACP and EVM measurement data from received test transmissions made by the AP 10(1) during the training session.

Figure 2:
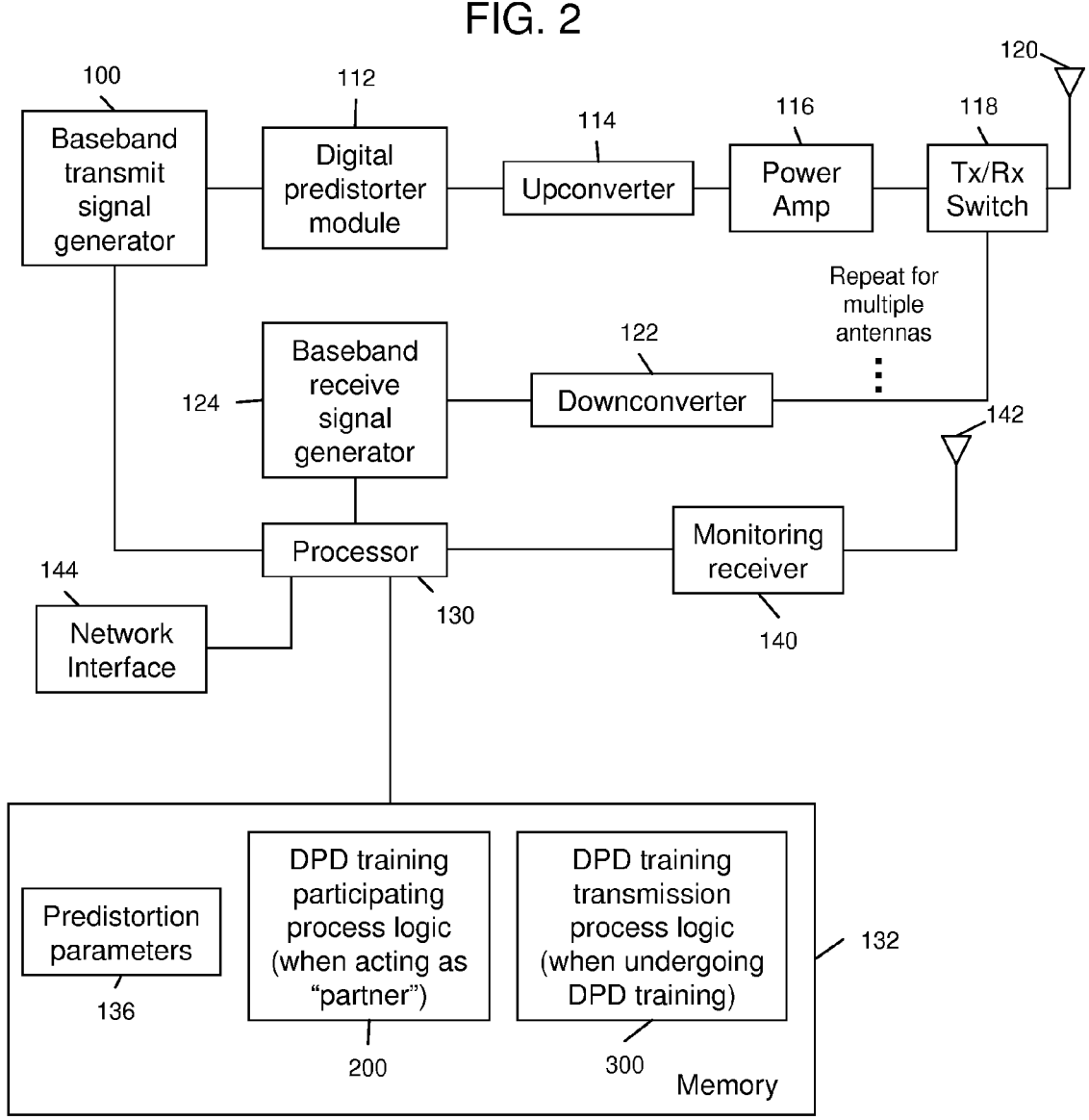
FIG. 2 is an example of a block diagram of a wireless network access point device configured to be the support the predistortion training session techniques described herein.

Turning now to FIG. 2, an example of a block diagram of an AP, identified generically as AP 10(i), is now described. The block diagram shown in FIG. 2 is meant to be an example and representative of a block diagram of any of the APs 10(1)-10(4), each of which is configured to serve as an AP for which predistortion training is to be made and to serve as a participating or partner AP in a predistortion training session of itself or any other AP.

An AP 10(i) comprises in a transmit signal path, a baseband transmit signal generator 100, a digital predistortion (DPD) module 112, an upconverter 114 and a power amplifier 116. In a receive signal path, the AP 10(i) comprises a downconverter 122 and a baseband receive signal processor 124. A transmit/receive (Tx/Rx) switch 118 is provided that couples either the power amplifier 116 or the downconverter 122 to an antenna 120, depending on whether the AP 10(i) is in a transmit mode or receive mode. In the case where the AP 10(i) is configured to transmit and receive via multiple antennas, then there are multiple instances of the upconverter 114 and power amplifier 116 in the transmit path, one instance for each antenna, and multiple instances of the downconverter 122 in the receive path, one instance for each antenna.

The baseband transmit signal generator 100 is configured to generate a baseband transmit signal for transmission via antenna 120, and the baseband receive signal processor 124 is configured to process a baseband receive signal output by the downconverter 122 from a received signal at the antenna 122. The baseband transmit signal generator 100 and the baseband receive signal processor 124 may be part of a single component, such as a modem, which may also include the digital predistortion module 112. When the AP 10(i) is configured to transmit and receive via multiple antennas, then there are multiple instances of both the baseband transmit signal generator 100 and baseband receive signal processor 124, one for each antenna, or a single component, e.g., a modem, that handles the baseband transmit signal generation of baseband transmit signals for each antenna and baseband receive signal processing of baseband receive signals for each antenna. The digital predistortion module 112 may be included as a functional block of the modem. For a multi-antenna AP, the functions of the digital predistorter module 112 are replicated for each transmit path. A single component or module may be configured to perform the predistortion functions with respect to baseband transmit signals for each transmit path to accommodate a plurality of transmit paths, one for each antenna.

There is also an optional monitoring receiver 140 connected to an associated antenna 142. The monitoring receiver 140 is configured to receive signals transmitted on a given channel in a frequency band and may be useful in connection with making measurements of signals in connection with a training session. A network interface device, e.g., Ethernet card, 144 is also provided that enables communication over the network 40 with the controller 20, to receive commands from the controller in connection with a training session.

The baseband transmit signal generator 100, digital predistorter module 112 and baseband receive signal processor 124 may be implemented in digital logic, in fixed or programmable form, and thus may be embodied by one or more application specific integrated circuits.

A processor 130 is provided, such as a microprocessor or microcontroller, that is configured to control various AP functions, including operations in connections with a predistortion training session, whether the AP is the device being trained or is serving as a participating device in the training session of itself or another AP. To this end, the processor 130 is configured to execute instructions stored in a memory 132. The processor configures the digital predistortion module 112 with stored predistortion parameters shown at 136 in memory 132. The predistortion parameters 136 may take the form of a predistortion matrix A or a scaling factors c, both of which are described further hereinafter. The memory 132 also contains DPD training participation process logic 200 and DPD training transmission process logic 300. The DPD training participation process logic 200 is executed by the processor 130 when the AP 10(i) is acting as a partner or participating AP in a DPD training session of itself or another AP, wherein the processor generates adjacent channel power and error vector magnitude measurement data with respect to reception of test transmissions by the AP undergoing predistortion training. The DPD training transmission process logic 300 is executed by the processor 130 when the AP 10(i) is undergoing training for the predistortion parameters that are used by its digital predistortion module 112 to generate the test transmissions. The DPD training participation process logic 200 and the DPD training transmission process logic 300 are described hereinafter in connection with FIGS. 7-10.

The processor 130 may be a programmable processor or a fixed-logic processor. In the case of a programmable processor, the memory 136 is any type of tangible processor readable memory (e.g., random access, read-only, etc.) that is encoded with or stores instructions. For example, the processor 130 is a microprocessor or microcontroller. Alternatively, the processor 130 may a fixed-logic processing device, such as an application specific integrated circuit or digital signal processor, that is configured with firmware comprised of instructions that cause the processor 130 to perform the functions described herein. Thus, the process logic 300 may take any of a variety of forms, so as to be encoded in one or more tangible media for execution, such as with fixed logic or programmable logic (e.g., software/computer instructions executed by a processor) and the processor 130 may be a programmable processor, programmable digital logic (e.g., field programmable gate array) or an application specific integrated circuit (ASIC) that comprises fixed digital logic, or a combination thereof. In general, the process logic 200 and process logic 300 may be embodied in a processor readable medium that is encoded with instructions for execution by a processor (e.g., processor 130) that, when executed by the processor, are operable to cause the processor to perform the functions described herein in connection with process logic 200 and process logic 300.

Figure 3:
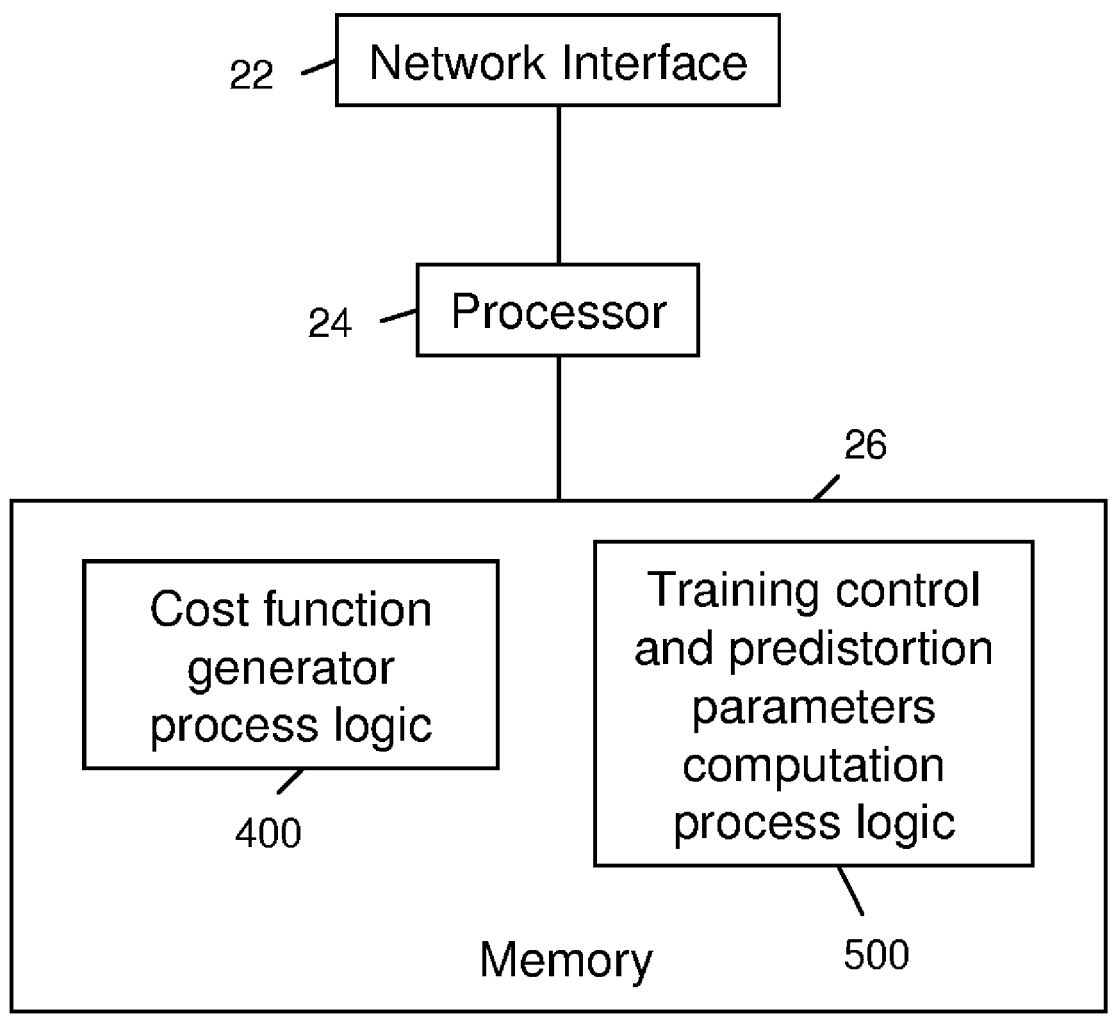
FIG. 3 is an example of a controller apparatus configured to initiate the predistortion training session and to compute predistortion parameters.

Turning now to FIG. 3, an example block diagram of the controller 20 is described. The controller 20 comprises a network interface 22 that is configured to perform communications with the APs via the wired network 40, for example. A processor 24 is provided that is configured to control various functions of the controller 20. The processor 24 executes instructions stored in memory 26 to enable the controller 20 to perform a DPD training session as described herein. To this end, the memory 26 stores instructions for cost function generator process logic 400 and instructions for training session and predistortion parameters computation process logic 500. The cost function generator process logic 400 is described hereinafter in connection with FIGS. 4 and 5, and the training session and predistortion parameters computation process logic 500 is described hereinafter in connection with FIGS. 6-9.

The processor 24 may take on any of the forms described above in connection with the processor 130 in FIG. 2.

In the following description, a predistortion technique is used that involves memory polynomial digital predistortion. This is meant by way of example only as there are different techniques for digital predistortion, such as those based on a look-up table.

In a memory polynomial digital predistortion technique, a polynomial equation represents the digital predistortion applied to a signal. The coefficients represent a polynomial approximation of the inverse of the amplitude and phase response of the power amplifier. For example, when a single sample s(m) of signal s is subject to memory polynomial predistortion, the output predistorted signal $s_{DPD}$ is:

$$S_{DPD}(m) = \sum_{q=0}^{Q} \sum_{n=1}^{N} a_{q,n} s(m-q) |s(m-q)|^{n-1}$$

where s(m) is the $m^{th}$ sample of the signal s, and $a_{q,n}$ is the $n^{th}$-order and $q^{th}$ memory coefficient of the memory polynomial, where q represents the memory length of the polynomial. An array of values for $a_{q,n}$ make up the matrix A. The matrix A of coefficients has the form:

$$A = \begin{bmatrix} a_{1,0} & a_{2,0} & \cdots & a_{n,0} \\ a_{1,1} & a_{2,1} & \cdots & a_{n,1} \\ \vdots & \vdots & \ddots & \vdots \\ a_{1,q} & a_{1,q} & \cdots & a_{n,q} \end{bmatrix}$$

As explained above, and in further detail hereinafter, training may involve selecting values for scaling factors c rather than values for $a_{q,n}$, which is more time consuming and computationally intensive.

The challenge in a digital predistortion scheme is selecting the $a_{q,n}$ coefficient values to cancel out the distortion created by the power amplifier. Determining the appropriate values for the predistortion parameters involves indirect training using a cost function based on some measurement data and other criteria. For example, EVM and ACP measurement data are useful as measurement data to determine the predistortion parameters. Thus, during a training session, a baseband transmit signal is subjected to predistortion with several different predistortion parameter values (e.g., different coefficients $a_{q,n}$) and ACP and EVM measurements made from reception of the resulting transmitted signals are used to determine which set of predistortion parameter values satisfy, e.g., minimize the cost function. In general, ACP and EVM measurement data are analyzed for a different set of predistortion parameters (e.g., coefficients) for each power level of operation, frequency channel of operation and each power amplifier (each transmit path). The techniques described herein are applicable to determining the appropriate predistortion parameters both for factory calibration and "in the field" calibration after the device has been deployed.

Power amplifiers in a transmit path or chain of a wireless device experience some drift in operation over time. As a result, an open-loop predistortion scheme, with one-time predistortion coefficient training, will be subject to performance degradation as the amplifier ages and its characteristics change. A closed-loop system, on the other hand, is common in systems with very stringent ACP and EVM requirements. A compromise is an open-loop system with periodically-triggered (or on demand) predistortion maintenance. To this end, the controller 20 is configured to trigger a particular AP for predistortion training, using either a "quick-tuning" scheme whereby a scaling factor c is adjusted or a full training (re-training) scheme whereby the matrix A of coefficients is adjusted, as described herein. The controller may implement this training periodically or on-demand based on monitored AP downlink performance as a trigger. When in "quick-tuning" or full retraining, the AP undergoing the predistortion training is configured to transmit frames to a monitoring radio receiver that is at another AP, at a CD, or at the AP itself that is undergoing the predistortion training.

The effectiveness of a given set, e.g. matrix A, of predistortion coefficients or a scaling factor c (in quick or fast tuning) is evaluated quantitatively by a cost function. The training or quick tuning seeks the set of coefficients or scaling factor, respectively, that satisfies, e.g., minimizes, the cost function. Different cost functions lead to different ultimate operating points for the predistortion module. One cost function may weight EVM heavily, leading to good EVM performance. Another cost function may weight ACP heavy, leading to a minimization in ACP. In some situations, focusing purely on minimizing one variable may be desired. In other situations, satisfying conditions of multiple variables may be desired.

A primary purpose of DPD is to reduce the effects of non-linearities of power amplifiers. However, the goals of using DPD for that purpose can be many. In an IEEE 802.11 WLAN, one goal may be to improve performance of a wireless transmitter by improving EVM. Another goal may be to meet regulations of a regulatory body at an edge of a frequency band allocated for operation of the wireless network. Another goal may be to meet requirements imposed in a specification of a standards body. In reality, all of these goals can be constantly considered, but have varying weights within a cost function depending on the current operating point and the specifications and regulations to be met at that operating point.

Figure 4:
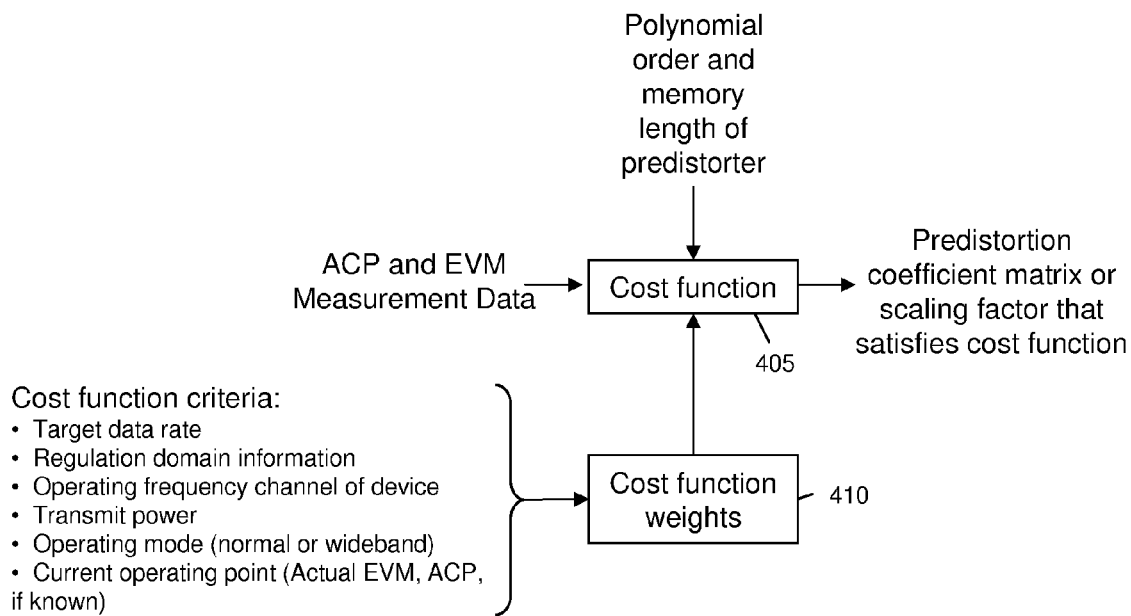
FIGS. 4 and 5 are flow diagrams illustrating use of a cost function in computing the predistortion parameters during a predistortion training session.
Figure 5:
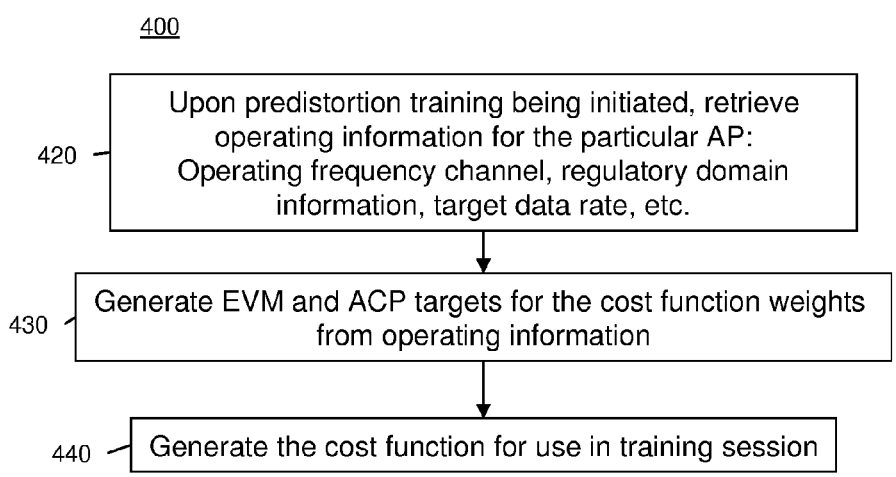

Turning now to FIGS. 4 and 5, a description of the cost function analysis is provided that is performed at the controller 20 based on the ACP measurement data and EVM measurement data. The cost function is shown at reference numeral 405 and the cost function weights are shown at 410 in FIG. 4. The input to the cost function 405 comprises the ACP and EVM measurement data and the cost function weights shown at 410. In addition, the polynomial order and memory length are considered in the cost function computations. The output of the cost function comprises the predistortion parameters, e.g., coefficients matrix A (if full training was performed) or scaling factor c (if quick-tuning was performed), that satisfies (minimizes) the cost function.

The cost function generator process logic 400 is now described with reference to FIG. 5. At 420, upon predistortion training being initiated (full training or quick-tuning), the controller 20 retrieves stored operating information for the particular AP, including operating frequency channel, regulatory information, transmit power, target data rate, operating mode of the particular AP (wideband or normal), current operating point (actual EVM and ACP, if known), etc. At 430, the controller 20 generates EVM and ACP targets for the cost function weights from the operating information. At 440, using the information obtained at 420 and 430, the cost function is generated for use in the training session.

EVM represents the average error-vector-magnitude for any frequency subcarrier that is not considered to be in a channel null. Subcarriers in channel nulls are identified during channel estimation and excluded from the EVM measurement, as described further hereinafter.

ACP can be broken down into $ACP_R$ and $ACP_L$, which is the adjacent channel power of the transmitted signal to the right and left, respectively, of the operating frequency channel of the AP undergoing predistortion training. $ACP_R$ and $ACP_L$ can further be broken down into any number of subsegments. In the following description, $ACP_R$ and $ACP_L$ and their subsegments are referred to simply as ACP.

The cost function, C(EVM,ACP), consists of measured EVM and ACP values for a given frame (or multitude of frames) used to arrive at an accurate EVM and ACP value for a frame predistorted with a given set of coefficients or a scaling factor. Measured EVM and measured ACP are represented as $EVM_M$ and $ACP_M$. The cost function C(EVM,ACP) is defined as:

$$C(EVM, ACP) = \sum_{n=1}^{N_{ACP}} [\alpha_n ACP_n] + \alpha_{EVM} EVM$$

$$\alpha_n = \frac{\gamma_n \beta_n^{ACP}}{\sum_{n=1}^{N_{ACP}} \gamma_k \beta_k^{ACP} + \beta^{EVM}}$$

$$\alpha_{EVM} = 1 - \sum_{n=1}^{N_{ACP}} [\alpha_n ACP_n]$$

$$\beta^{EVM} = \max\left[0, \frac{(EVM - EVM_{Target})}{EVM}\right]$$

$$\beta_n^{ACP} = \max\left[0, \frac{(ACP_n - ACP_{n,Target})}{ACP_n}\right]$$

$$1 = \sum_{n=1}^{N_{ACP}} \gamma_n$$

where $\gamma_n$ is the weighting put on a given $ACP_n$ measurement to weight the measurement within the group of all ACP measurements. $\gamma_n$ can be set to equally weight such that, $$\gamma = \frac{1}{N_{ACP}}$$

or it can be unequally weighted as set by the cost function generator. $EVM_{Target}$ and $ACP_{Target}$ are target values for EVM and ACP for a given AP. A further explanation of the cost function and the inputs to the cost function are described hereinafter.

Figure 6:
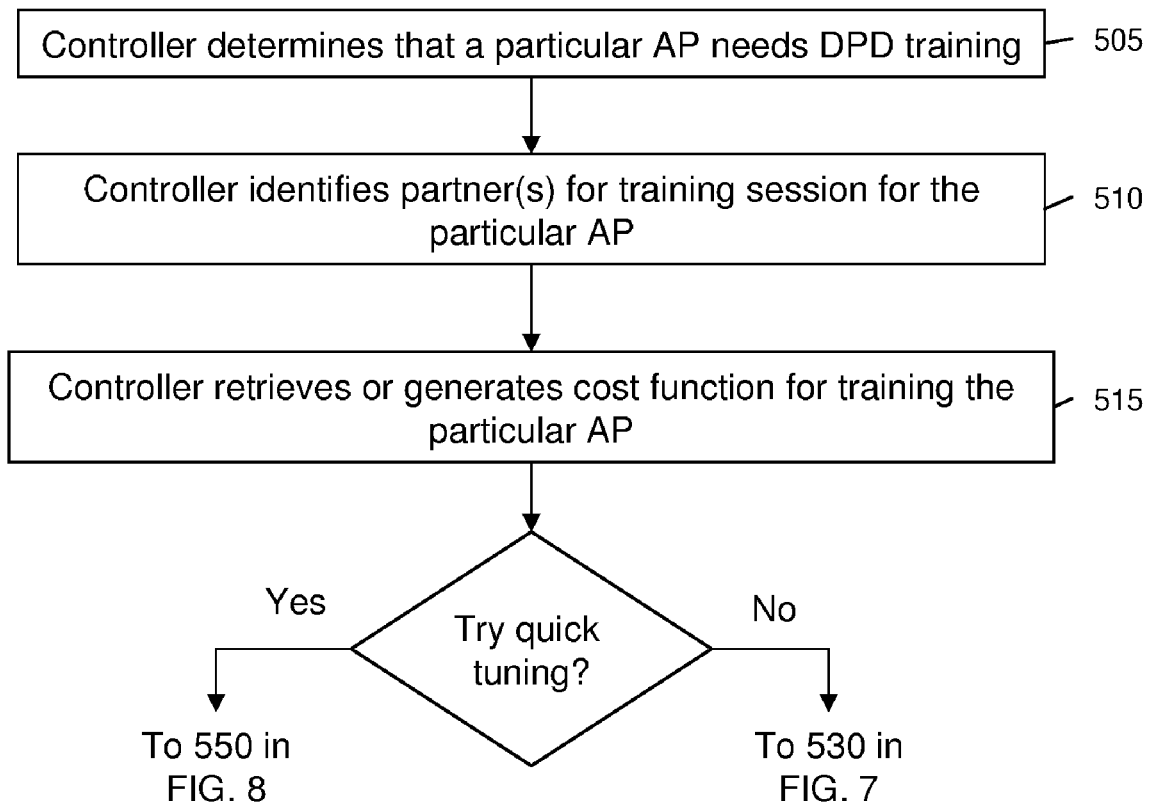
FIGS. 6-8 depict flow charts for training and predistortion parameters computation process logic executed in the controller apparatus for a predistortion training session.
Figure 7:
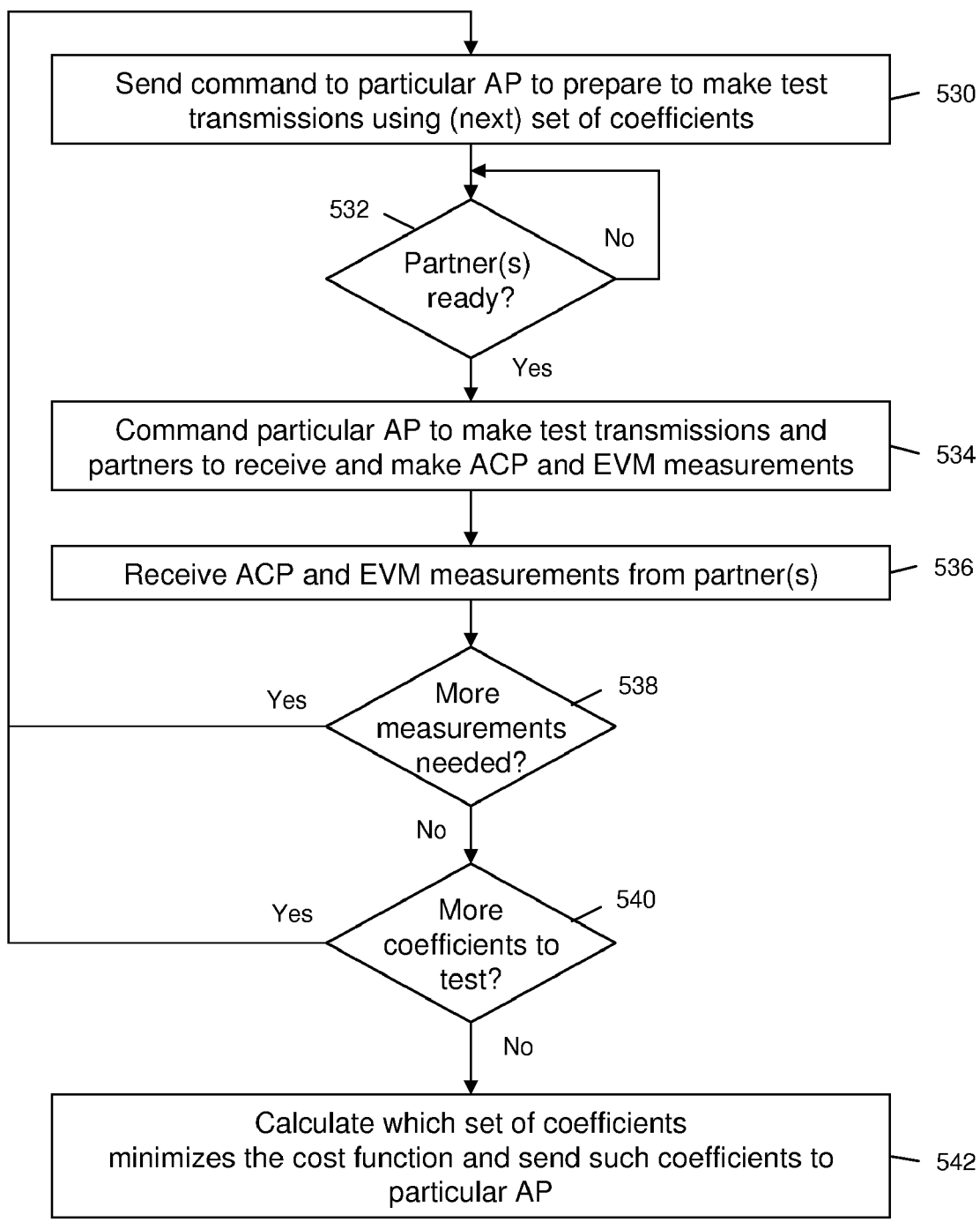

Reference is now made to FIG. 6 for a description of the training session and predistortion parameters computation process logic 500. At 505, the controller determines that a particular AP requires DPD training. The determination at 505 may be based on a predetermined periodic schedule to train each AP in the field, or based on monitored downlink performance characteristics for a given AP. At 510, the controller identifies (selects or designates) one or more APs in the field to serve as partner APs and participate in a training session. These partner APs are also referred to herein as participating APs. The particular AP undergoing the training may also serve as a participating AP insofar as it can simultaneously receive a transmission sent via one antenna on another antenna, in the case where that AP is a multi-antenna AP. In some other applications, the AP may have a separate radio receiver that is used solely for monitoring signals in the frequency band, as described above in connection with FIG. 2. The controller may select APs to be partner APs for a training session with respect to a particular AP based on their proximity (physical location or receive strength of signals from the particular AP).

For example, the controller may send a command to the particular AP to transmit a plurality of frames on one or more channels on which other APs are configured to receive. These other APs then report receive signal strength measurement data as well as coherence time estimates based on the frames sent by the particular AP to the controller 20. The coherence time is a measure of the minimum time required for change of a predetermined magnitude of the conditions of a wireless channel to become uncorrelated from its previous value. The controller 20 can then prioritize those APs that are best suited to serve as a participating AP with respect to the particular AP undergoing training by coherence time estimates, where those APs that made longer coherence time estimates are given higher priority. The controller 20 then selects one or more participating APs accordingly.

At 515, the controller retrieves or generates the cost function for training the particular AP. This corresponds to the process described above in connection with FIGS. 4 and 5. At 520, the controller determines whether to try a quick-tuning training session or a full training session for the particular AP. In one form, quick tuning is used for a first attempt (out of factory calibration or since the last full retraining). The performance (EVM or ACP) is compared with the performance of other APs with similar/same cost functions. In other form, the controller determines whether the cost function analysis results for that AP is below threshold that necessitates performing a full retraining. In still another form, data rate statistics for the AP are used to determine whether to perform quick tuning or full retraining. For example, when the data rate is very low (below a threshold), a full retraining is performed if a quick tuning has already been attempted. In yet another form, the time duration between last full retraining is used to determination whether to perform a quick tuning or full retraining. For example, if this time duration is greater than a threshold, a full retraining is performed. When a full training session is to be performed, the process continues at 530 in FIG. 7 and when a quick-tuning (fast training) session is to be performed, the process continues at 550 in FIG. 8.

At 530, the controller 20 sends a transmission command to the particular AP configuring it to prepare to make test transmissions using a set of coefficients, that is, values for matrix A. When the full-training session first begins, the controller 20 sends the first or initial values for the matrix A. At 530, the controller also sends reception ready commands to the one or more participating APs instructing them to prepare to receive the test transmissions from the particular AP and to make measurements. At 532, the controller determines whether it has received confirmation from the participating APs that they are ready to receive and make measurements. When confirmation is received by the controller 20, then at 534, the controller sends a command to the particular AP to make the test transmissions and to the participating APs to receive and make ACP and EVM measurements from the received test transmissions. The controller 20 configures the particular AP to send the test transmissions, which may take the form of multiple frames or symbols within a frame or groups of symbols within the frame, where each frame (or symbol within the frame or groups of symbols within the frame) is transmitted by the particular AP with a different set of predistortion coefficients A. In other words, the particular AP is configured by the transmission command to transmit multiple symbols or multiple sets of symbols, each symbol or set of symbol with different predistortion parameters.

At 536, the controller receives the ACP and EVM measurements made by the participating APs from reception of the test transmissions. The procedures for obtaining ACP measurement data are described hereinafter in connection with FIG. 9 and the procedures for obtaining EVM measurement data are described hereinafter in connection with FIG. 10.

At 538, the controller 20 determines whether it needs more measurements in order to ensure that the training can converge. When more measurements are needed, the controller repeats functions 530, 532, 534 and 536 on the basis of a next set of coefficients (matrix A). At 540, the controller 20 determines whether there are any additional coefficients (values for matrix A) to test. If there are more coefficients to test, then the process repeats functions 530, 532, 534 and 536 with the next set of coefficients. Thus, once the EVM and ACP measurement data is received by the controller 20, the controller 20 will either provide the particular AP with a new set of coefficients to use in a subsequent round of test transmissions or conclude that the full training session has converged.

At 542, the controller 20 runs the cost function on the received ACP and EVM measurement data to compute and determine which set of coefficients (which version of matrix A) minimizes the cost function. During the full training procedure depicted in FIG. 7, several sets of coefficients are used for the test transmissions and the cost function associated with measurement data obtained for each set of coefficients is analyzed. The computations for the cost functions are provided above in connection with the description of FIGS. 4 and 5.

The controller 20 sends to the particular AP a message identifying or containing those coefficients for storage and use by the digital predistortion module in the particular AP when predistorting a baseband transmit signal for transmission during its normal operating mode. At the conclusion of the procedure shown in FIG. 7, the particular AP and the participating APs return to their normal operating mode.

Over time, heavy use and even operation temperature, the predistortion coefficients may not be effective. Instead of retraining the predistortion coefficients, which can be processor and time intensive and not practical in the field, a scaling factor to the signal input to the predistortion module can be provided, and adjusted as necessary. This is the purpose of the quick-tuning procedure. Thus, a scaling factor $c_k$ is applied to the baseband signal s that is input to the predistortion module from the baseband transmit signal generator. The mathematical expression using the scaling factor is:

$$s_{DPD}^k(m) = F(c_k s(m), A)$$

$$A = \begin{bmatrix} a_{1,0} & a_{2,0} & \cdots & a_{n,0} \\ a_{1,1} & a_{2,1} & \cdots & a_{n,1} \\ \vdots & \vdots & \ddots & \vdots \\ a_{1,q} & a_{1,q} & \cdots & a_{n,q} \end{bmatrix}$$

where $$F(s(m), A) = \sum_{q=0}^{Q} \sum_{n=1}^{N} a_{q,n} s(m-q) |s(m-q)|^{n-1}$$

s is the baseband transmit signal input to the predistortion module, $c_k$ is the scaling factor for the kth frame, symbol or set of symbols, and $S_{DPD}^k$ is the predistorted signal for the kth frame, symbol or set of symbols. The matrix A contains the predistortion coefficients and in the quick-tuning procedure, are the current set of predistortion coefficients used by the particular AP. They are not varied during the quick-tuning procedure.

If the power amplifier in a transmit chain of the particular AP has undergone a drift in its operation, it is likely that a change in operating point has occurred and not a drastic migration of the coefficients. Therefore, the operating point of the predistortion module can be adjusted to match the change in operating point of the amplifier. Instead of retraining the coefficients in matrix A, which would require many iterations to converge on 2N elements (N complex coefficients), a low iteration and thus faster training can be done to converge one value, the scaling factor c.

Figure 8:
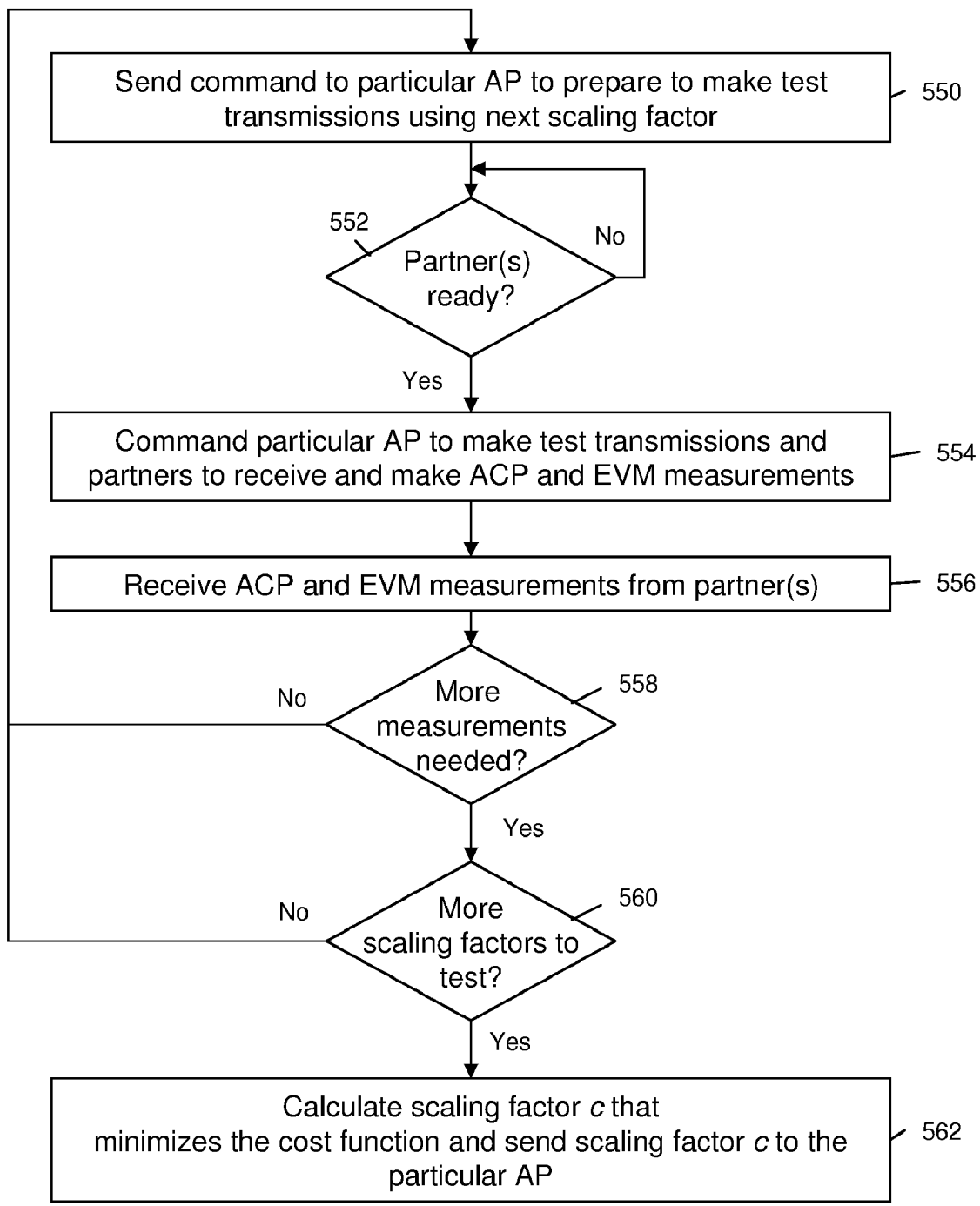

Turning now to FIG. 8, the quick-tuning procedure is now described. At 550, the controller sends a transmission command to the particular AP configuring it to prepare to make test transmissions using values for a set of scaling factors c.

When the quick-tuning procedure first begins, the controller 20 sends the first or initial values for the scaling factor c. Also at 550, the controller sends reception ready commands to the one or more participating APs instructing them to prepare to receive the test transmissions from the particular AP and to make measurements. At 552, the controller 20 determines whether it has received confirmation from the participating APs that they are ready to receive and make measurements. When confirmation is received by the controller 20, then at 554, the controller sends a command to the particular AP to make the test transmissions and to the participating APs to receive and make ACP and EVM measurement from the received test transmissions. The controller 20 configures the particular AP to send the test transmissions such that each frame, each symbol or every N symbols are sent with a different scaling factor. At 556, the controller 20 receives the ACP and EVM measurements made by the participating APs. Functions 558 and 560 are similar to functions 538 and 540 described above in connection with FIG. 7. At 562, the controller runs the cost function on the ACP and EVM measurement data to determine which scaling factor minimizes the cost function. The controller 20 sends that scaling factor c to the particular AP for storage and use in the particular AP when making transmissions during its normal operating mode. At the conclusion of the procedure shown in FIG. 8, the particular AP and the participating APs return to their normal operating mode.

The quick-tuning and full training procedures are executed for each transmit train individually for an AP that has multiple antennas for transmit purposes and thus has multiple transmit chains. In this case, test transmission are sent to a partner AP via a single transmit path only (the one being trained) and not from multiple transmit paths simultaneously.

If the training procedures described above take place during factory calibration of APs, the calibration equipment is essentially a participating AP in terms of the procedures described above. Moreover, EVM and ACP can be measured simultaneously by the calibration equipment without consideration of the deployment environment.

Figure 9:
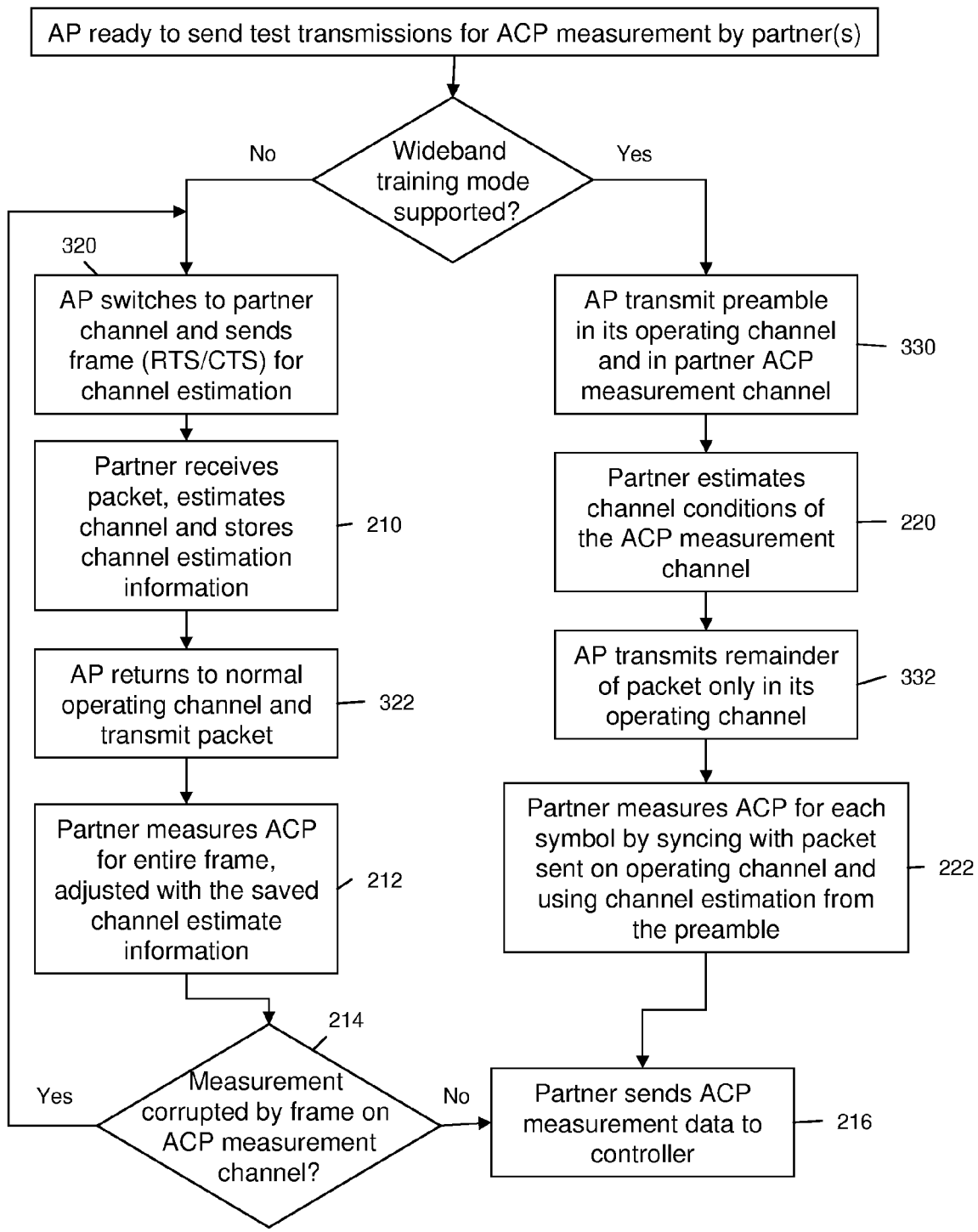
FIG. 9 is a flow chart depicting operations of a particular access point device undergoing predistortion training and a participating access point device in connection with obtaining adjacent channel power measurement data during a training session.

Reference is now made to FIG. 9 for a description of those aspects of the DPD training participating process logic 200 executed in an AP serving as a participating AP during a training session and of the DPD training transmission process logic 300 executed in the particular AP (the AP undergoing predistortion training) during a training session when ACP measurement data is obtained at participating APs. To this end, functions of the DPD training participating process logic 200 are identified by reference numerals in the 200's and functions of the DPD training transmission process logic 300 are identified by reference numerals in the 300's.

The same wireless channel conditions that affect the EVM measurements made at a participating AP will also affect the ACP measurement by causing ACP to be measured much lower than it should be for frequencies in a channel null. The procedure for making EVM measurements is described hereinafter in connection with FIG. 10. However, since the ACP measurements are taken "off-channel", that is, on a frequency channel other than the one used by the particular AP for normal operation, an estimate of the over-the-air wireless channel conditions cannot be made during the ACP measurement. Therefore, the transmitting device will need to intermittently switch to the adjacent channel (if the adjacent channel is not in a restricted frequency band) to send a frame to a participating AP for channel estimation. Once the channel estimate is made, the frequency dependence in the channel can be removed from future ACP measurements. The switching frequency between on-channel transmission (in the operating frequency channel of the AP) and off-channel transmission is determined by the estimated coherence time. New channel estimates are made within the coherence time.

When the operating frequency channel of the particular AP is adjacent to a restricted frequency band, it cannot make intermittent transmissions in the restricted band. In this situation, participating APs with more than one receive antenna are given priority in order to minimize the effect of the over-the-air wireless channel conditions on the ACP measurement. Alternatively, the particular AP and the participating AP can enter into a special wideband (e.g., 40 MHz) mode comprising two adjacent channels (an upper channel and a lower channel) so that a first "channel estimation" portion (e.g., preamble portion) of the test transmission packet is transmitted in both the upper and lower channels, but a second portion (e.g., data portion) of the test transmission packet is only transmitted in the frequency channel, i.e., adjacent channel, under test. Thus, the adjacent channel would only have a portion of the packet transmitted in it, and the rest of the received power in the adjacent channel would be due to spectral regrowth from the in-band power of the channel under test.

At 310, the particular AP determines that it is ready to send a test transmission for ACP measurement by participating APs. At 315, the particular AP determines to perform the test transmissions for the ACP measurements using either a standard single channel or using two or more channels aggregated together (e.g., two 20 MHz WiFi channels) in a wideband mode. The latter wideband technique works when both the particular AP and the participating APs have the wideband operation mode capability. When it is determined that both the particular AP and the participating APs do not have wideband operation mode capability, then the process goes to the left branch of the flow chart shown in FIG. 9, and otherwise it goes to the right branch of the flow chart shown in FIG. 9.

In normal single channel mode, at 320, the particular AP switches its transmission frequency to a channel of a participating AP and sends a packet, e.g., a request to send (RTS) FRAME as part of a RTS-clear to send (CTS) exchange with the participating AP. At 210, the participating AP receives the packet, estimates the channel conditions and stores the channel estimation information. The term "channel" used herein in connection with the channel estimate refers to the over-the-air wireless channel between the antenna(s) of the particular AP and the antenna(s) of the participating AP.

At 322, the particular AP returns to its normal operating transmission frequency channel and transmits test transmissions using the appropriate coefficients or scaling factor (depending on whether the training is a full training session or quick-tuning session). At 212, the participating AP receives the frame sent by the participating AP on its normal operating frequency channel and measures ACP for the frame and adjusts the ACP measurement with the saved channel estimate information at 210. At 214, the participating AP determines whether the ACP measurement is corrupted by a frame on the ACP measurement channel. In other words, at 214, a check is made to determine whether a frame "collided" with the off-channel frame measurement for the ACP. If a packet from client device is received while the partner AP is waiting to receive a training packet, the transmission of the training packet is repeated because the ACP measurement would contain the on-channel packet reception. Also, a packet could be sent off channel by an AP at the same time and could corrupt the measurement and thus the benefit of knowing when a packet was received on the partner AP channel would be lost. Therefore, if corruption is determined at 214, the process repeats from 320 to measure the ACP as shown in FIG. 9. In one example, N plurality of training frames are automatically sent. When there is not a significant variation in the ACP measurement over some subset M of the N plurality of training frames, then it is determined that there is no off-channel corruption of the training packet over the M frames and an average of the measurements resulting from those M frames is used.

At 216, the participating AP sends the ACP measurement data to the controller.

The intermittent transmission of test transmissions on the adjacent channel and on the normal operating channel is performed is performed to enable one or more participating APs to generate channel estimate information of the over-the-air channel to allow the participating device to adjust the ACP measurement data using the channel estimate information.

Obtaining ACP measurement data when the particular AP and the participating AP are capable of operating in a wideband mode is now described. At 330, the AP transmits a first portion (e.g., preamble) of a test transmission packet in its operating frequency channel and in the adjacent channel, i.e., the particular APs ACP measurement channel. At 220, the particular AP estimates channel conditions of the ACP measurement channel based on reception of the preamble in that channel. At 332, the particular AP transmits the remaining portion of the test transmission packet (e.g., data portion) only in its normal operating channel. At 222, the participating AP measures ACP for each symbol of the packet by synchronizing with the packet sent in the particular APs normal operating channel and using the channel estimation information obtained at 220 from reception of the preamble in the ACP measurement channel. At 216, the participating AP sends the ACP measurement data to the controller.

The procedures depicted in FIG. 9 are performed between the particular AP and each participating AP in order to separately obtain ACP measurement data from each participating AP.

Figure 10:
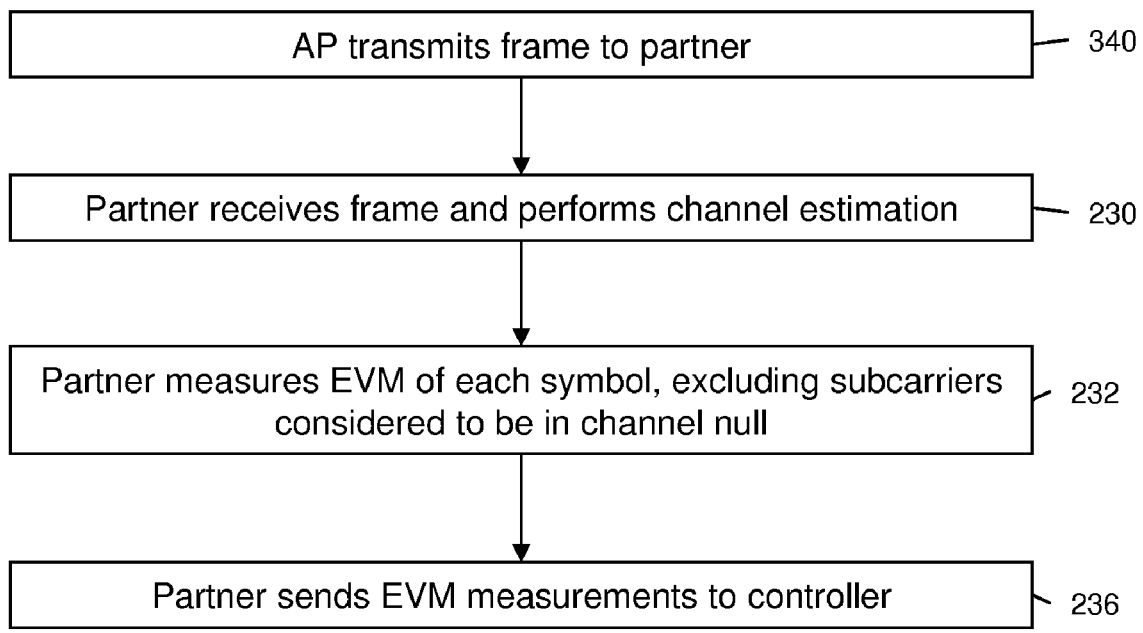
FIG. 10 is a flow chart depicting operations of a particular access point device undergoing predistortion training and a participating access point device in connection with obtaining error vector magnitude measurement data during a training session.

Reference is now made to FIG. 10 for a description of those aspects of the DPD training participating process logic 200 executed in an AP serving as a participating AP during a training session and of the DPD training transmission process logic 300 executed in the particular AP during a training session when EVM measurement data is obtained at participating APs. To this end, functions of the DPD training participating process logic 200 are identified by reference numerals in the 200's and functions of the DPD training transmission process logic 300 are identified by reference numerals in the 300's.

The channel between the transmitting AP and the participating AP device may have a frequency dependent null that weakens one or more subcarriers at the participating AP. This will affect the EVM measurement because those severely weakened subcarriers will contain a significant amount of noise. Therefore, during channel estimation using a long training field, the strength of each subcarrier is determined and used in the EVM measurement by excluding the weaker subcarriers. Any subcarrier that has a receive power that is X dB below that of the top Y percentile receive power of all subcarriers is excluded. If the device has more than one receive antenna, the channel response will have less impact as the receiver maximizes the receive signal-to-noise ratio for all subcarriers across multiple antennas.

At 340, the particular AP transmits a frame to the participating AP. At 230, the participating AP receives the frame and estimates the channel conditions. At 232, the participating AP measures EVM of each symbol of the frame, excluding subcarriers considered to be in a channel null, using the technique described above, for example. At 236, the participating AP sends the EVM measurement data to the controller.

Thus, FIG. 9 illustrates two processes that are useful to measure ACP data and this is performed during a one phase of a training session. FIG. 10 illustrates a process that is useful to measure EVM data and this process is performed during another phase of a training session. In other words, during a first phase, the controller sends commands to cause the particular AP to send the test transmissions on an operating channel of the particular AP for reception by the one or more participating APs and during a second phase, the controller 20 sends commands to cause the particular AP to send the test transmissions on a channel that is adjacent to the operating channel. The controller receives the EVM measurement data generated by the one or more participating wireless devices from reception of the test transmissions during the first phase and receives the ACP measurement data generated by the one or more participating APs from reception of the test transmissions during the second phase. The second phase, during which ACP measurement data is obtained, may involve the single channel approach or the wideband multichannel approach as depicted in FIG. 9.

When obtaining ACP measurements and EVM measurements, channel estimate information (e.g., as obtained at 210, 220 in FIG. 9 and at 230 in FIG. 10) is useful to remove the effect of strong channel fading connections. Removing the effects of the "linear" wireless channel fading conditions to train on the nonlinear power amplifier distortion allows for computing more accurate and reliable predistortion coefficients.

As explained above in connection with FIGS. 4 and 5, the cost function generator receives various inputs related to the operating conditions or parameters of the AP that undergoing training. In other words, the cost function is applied to the measurement data so as to weight the ACP measurement data and the EVM measurement data, respectively, depending on a distance of the ACP measurement data and the EVM measurement data to respective desired values and based on operating requirements of the particular AP. The current operating point of an AP may be represented by EVM and ACP for the AP. When this information is available, the cost function can be created more directly. If the EVM target is already met for the AP and the ACP target is not met, the ACP may be weighted more heavily subject to a limit to ensure that the EVM target is not lost. Conversely, if the ACP target is already met, and the EVM target is not, EVM is weighted more heavily subject to a limit to ensure that the target is not lost. If neither target is met, each weighting will depend on the distance to the target but a limit may be set on both EVM and ACP to ensure that neither drifts more than $X_{EVM}$ or $X_{ACP}$ from their respective targets during any updating of the predistortion coefficients.

The following information may be used to set EVM and ACP targets and limits during each iteration of the training sequence, and to set polynomial order and memory length of the predistorter.

Target Data Rate. For example, the IEEE 802.11a/g/n specifications require different EVM performance for each data rate. Therefore, the controller 20 would select a certain EVM margin for each data rate. This could be used to relax the EVM target for certain data rates (that do not require low EVM) and focus the cost function on ACP reduction if required by regulatory requirements for that channel. Generally, ACP requirements do not vary between data rates.

Regulatory Requirements. Regulatory bodies in a given jurisdiction (country) limit emissions in certain frequency bands. The proximity of these restricted bands to the operating channel of an AP can be used to weight ACP in the cost function. The closer the restricted band is to the operating channel of the device, the more heavily weighted ACP will be.

Operating Channel of the Device. Regulations limit radio frequency (RF) emissions in certain frequency bands. The proximity of these restricted bands to the operating channel of the device can be used to weight ACP in the cost function. The closer the restricted band is to the operating channel of the device, the more heavily weighted ACP will be. If the AP's operating channel is adjacent to a restricted band edge, memory length can be added to the predistortion polynomial to minimize ACP.

Transmit Power. Transmit power of the AP is useful when EVM and ACP cannot be estimated accurately, but relative values are used in predistortion training. The power amplifier of the AP will be well characterized with respect to EVM and ACP versus transmit power. There will be certain transmit power levels where the EVM goal is met, but the ACP goal is not or the ACP goal is met, but the EVM goal is not.

Operating Mode. Operating mode (standard single channel or wideband) is only needed if EVM and ACP cannot be estimated accurately, but relative values are used in training. When the AP is transmitting in the wideband high-throughput mode, there will be more severe intermodulation products resulting in worse ACP due to the high correlation between the lower and upper band used for a transmission. A wideband high throughput mode may exhibit more spectral regrowth than a 20 MHz mode signal. The controller weights ACP higher in the cost function for this mode.

Non-Zero Memory Length Polynomial Predistorter to Minimize Spectral Regrowth to Target Side of the Band The following is an example in which a non-zero memory length polynomial predistorter is used to minimize spectral regrowth to a target side of the frequency band. In polynomial predistortion, an approximation of the inverse of the amplitude and phase response of an amplifier is applied to the baseband transmit signal. This attempts to cancel out the non-linear distortion of the RF power amplifier in the transmit chain. The actual amplitude and phase response of the amplifier is typically not known. The approximation relies on indirect training of the polynomial coefficients by minimizing a cost function that performs a direct search or steepest descent algorithm to identify the target coefficients.

In most modes of operation, EVM is targeted for minimization. However, when a transmitting device is operating in a frequency location near a restricted band, ACP may be targeted for minimization so that the spectral regrowth of the transmitted signal does not breach the restricted band emissions. In nearly all cases, the restricted band edge is to one side of the transmitting device's (i.e., that AP's) operating frequency channel. Therefore, improving ACP is only important on that side.

Memory polynomials with a memory length greater than 0 have an interesting property that serves this band edge scenario well. When memory is added to the polynomial, the spectral regrowth of the transmitted signal can be asymmetrically shaped with predistortion. Therefore, a cost function that focuses on minimizing ACP to only the band edge side can lead to much greater reduction in spectral regrowth to the band edge side, while maintaining regrowth on the other side of the spectrum of the transmitted signal.

The memory polynomial for the band edge scenario needs to have a memory length greater than 0. The polynomial order is not important but an order greater than 3 is suitable. The EVM target is the target specified by the communication standard, e.g., IEEE 802.11, or based on an engineering design decision. The ACP to the band edge has a target based on the restricted band requirements. The ACP to the non-band edge side has an ACP target of the ACP to that side measured without predistortion if it is desired to maintain performance on the non-band edge side. Otherwise, if the non-band edge ACP is unimportant, that ACP measurement can be kept absent from the cost function by giving it a target ACP of infinity.

Translating Between Power Levels for Predistortion

In a digital predistortion system that uses, for example, memory polynomial predistortion, coefficients are determined at all operational power levels. For example, if the transmit power is targeted at 20 dBm, the power level needs to be set at 20 dBm, and a training sequence needs to be performed to determine the polynomial coefficients that minimize the cost function, as explained above These coefficients only minimize the cost function when the AP is operating at 20 dBm. Using these coefficients at 18 dBm or at 22 dBm could result in worse performance than the AP would have without predistortion. However, it is possible to use coefficients determined for one power level at another power level by applying a scaling factor to the signal at the input of the predistorter.

The ability to translate coefficients from one power level to the next relies on the fact that each set of predistortion coefficients are related. The coefficients represent a polynomial approximation of the inverse of the amplitude and phase response of the power amplifier. For each power level, the approximation is accurate over only a certain range of input and output values. Outside that range, the approximation error widens considerably. Each set of coefficients shifts the range of input/output values for which the approximation is accurate in order to have the greatest impact on the cost function for a particular power level. Therefore, each set of coefficients contains an accurate approximation of some range of the curve. For many power levels, these accurate approximation ranges will overlap considerably. Therefore, power levels can share sets of coefficients provided that a scaling correction is applied to the input of the predistorter. This power translation scaling factor is required because the predistorter module is expecting to predistort a signal to be transmitted at one power level, but the signal is ultimately transmitted at another power level.

If a set of polynomial or look-up-table (LUT) coefficients $A_{P1}$ were trained for power level P1 (in dBm), that set of coefficients can be used at power level P2, provided that a significant range of overlap exists between their accurate approximation ranges. A power translation scaling factor scaling factor, $C_{P1,P2}$ is applied to the signal input at the predistorter where $C_{P1,P2} = 10^{(P2-P1)/20}$ The memory polynomial predistortion equation that takes into account the scaling factor to correct for a different power level is:

$$S_{DPD}^{P2} = F(c_{P1,P2}S, A_{P1})$$

where $$F(S, A) = a_1 S + \sum_{n=2}^{N} a_n S|S|^{n-1}$$

S is the input to the predistorter and $S_{DPD}$ is the output from the predistorter.

Before translating coefficients to another power level, how well a set of coefficients translates to the target power level may be tested. One test is to see how much of the distribution of input amplitude values will fall within the accurate approximation range for the translated polynomial or LUT fit.

The following expression is useful for this determination:

$$\varepsilon = \frac{1}{s_{max} - s_{min}} \int_{s=s_{min}}^{s_{max}} F_{P_2}(c_{P1,P2}s) - F_{P_2}(s)$$

$$F_{P_n}(s) = \sum_{q=0}^{Q} \sum_{k=1}^{K} a_{q,k}^{P_n} s|s|^{k-1}$$

where $a_{q,k}^{P_n}$ is the $k^{th}$-order, $q^{th}$ memory predistortion coefficient that was trained for an amplifier power output of $P_n$. If $\varepsilon > \varepsilon_{threshold}$, the inverse amplifier response does not overlap enough between the two power levels. If $\varepsilon <= \varepsilon_{threshold}$, the inverse amplifier responses overlap enough for translation to occur from either power level to any power level in between. The example above specifically deals with a predistortion function, F(s), that is memory polynomial predistortion. However, this can be expanded to any predistortion function, including LUT predistortion. If no power levels overlap enough to use the translation equation, translation between power levels can only be evaluated by trial and error.

Reference is now made to FIG. 11 for a description of a process 250 that is performed in the AP when applying predistortion to a baseband transmit signal. At 252, the predistortion module receives the time domain baseband signal to be transmitted. At 254, the transmit information is retrieved from memory or other control parameters, such as the transmit power level and the predistortion coefficients. An indication is stored in the AP as to the power level of the AP for which a given set of predistortion coefficients were generated. At 256, the AP determines whether stored predistortion coefficients exist for the transmit power level to be used for the transmission (the so-called target power level). When predistortion coefficients exist for the target power level, then at 258, those coefficients are retrieved and at 260, the baseband transmit signal is predistorted with the predistortion module using those coefficients.

On the other hand, when no coefficients exist for the target power level, then at 262, it is determined whether there are stored coefficients for a power level that is close (nearby) the target power level. For example, a predetermined range of power (dBm) may be used for the determination made at 262 as to whether there are stored coefficients for a power level that is sufficiently close to the target power level. When it is determined that there are stored coefficients for power level that is sufficiently close to the target power level, then the baseband signal is multiplied by an appropriate power translation scaling factor, as explained herein, and the coefficients for the nearby power level are used for predistorting the baseband signal after it is scaled by the scaling factor. If there are no stored coefficients for a sufficiently close power level, then predistortion is not applied to the baseband signal and the AP may send a notification to the controller 20 as indicated at 266.

The techniques described herein may be embodied in various forms, where certain functions are performed in the controller and others in an AP. In terms of functions performed at the controller, a method is provided comprising: at a controller apparatus that is capable of communicating with a plurality of wireless devices, identifying a particular wireless device of the plurality of wireless devices that requires adjustment of predistortion parameters used by the particular wireless device when transmitting a signal; identifying one or more participating wireless devices to participate in a training session during which the particular wireless device makes test transmissions and the one or more participating wireless devices make measurements based on reception of the test transmissions sent by the particular wireless device; sending commands from the controller apparatus to the particular wireless device and to the one or more participating wireless devices to initiate the training session; at the controller apparatus, receiving measurement data from the one or more participating wireless devices based on reception of the test transmissions from the particular wireless device during the training session; and determining predistortion parameters for use by the particular wireless device based on the measurement data received from the one or more participating wireless devices.

In terms of the controller itself, an apparatus is provided comprising a network interface device configured to enable communications over a network to communicate with a plurality of wireless devices configured for wireless communication; and a processor, where the processor is configured to: identify a particular wireless device of the plurality of wireless devices that requires adjustment of predistortion parameters used by the particular wireless device when transmitting a signal; identify one or more participating wireless devices to participate in a training session during which the particular wireless device makes test transmissions and the one or more participating wireless devices make measurements based on reception of the test transmissions sent by the particular wireless device; send commands to the particular wireless device and to the one or more participating wireless devices to initiate the training session; receive measurement data from the one or more participating wireless devices based on reception of the test transmissions from the particular wireless device during the training session; and determine predistortion parameters for use by the particular wireless device based on the measurement data received from the one or more participating wireless devices.

These functions may also be embodied in a tangible processor readable memory medium that stores or is encoded with instructions that, when executed by a processor, cause the processor to perform the functions associated with each of the process logic 200 and 300 in a wireless access point network device 10(*i*) and each of the process logic 400 and 500 in the controller apparatus 20.

A system is likewise provided that comprises the controller referred to above, and the plurality of wireless devices, wherein each wireless device comprising a baseband signal generator that is configured to generate a baseband transmit signal, a digital predistorter module that is configured to predistort the baseband transmit signal according to the predistortion parameters to output a predistorted baseband transmit signal, an upconverter that is configured to upconvert the predistorted baseband transmit signal and a power amplifier that is configured to amplify the upconverted predistorted baseband transmit signal for transmission via an antenna, and a processor configured to process commands received from the apparatus so as to serve as the particular wireless device to be trained or a participating wireless device during the training session.

Further still, a wireless communication device is provided that is configured to support the predistortion training concepts described herein. The wireless communication device comprises a baseband signal generator that is configured to generate a baseband transmit signal; a digital predistorter module that is configured to predistort the baseband transmit signal according to the predistortion parameters to output a predistorted baseband transmit signal; an upconverter that is configured to upconvert the predistorted baseband transmit signal to produce an upconverted predistorted baseband transmit signal; a power amplifier that is configured to amplify the upconverted predistorted baseband transmit signal for transmission via an antenna; a network interface device configured to enable communications over a network; and a processor configured to process commands received via the network from a controller so as to train the predistortion parameters used by the digital predistortion module during a training session initiated by the controller or to participate and make measurements with respect to another wireless communication device during a training session.

The above description is by way of example only.

What is claimed is:

1. A method comprising:
   at a controller apparatus that is capable of communicating with a plurality of wireless devices, identifying a particular wireless device of the plurality of wireless devices that requires adjustment of predistortion parameters used by the particular wireless device when transmitting a signal;
   identifying one or more participating wireless devices to participate in a training session during which the particular wireless device makes test transmissions and the one or more participating wireless devices make measurements based on reception of the test transmissions sent by the particular wireless device;
   sending commands from the controller apparatus to the particular wireless device and to the one or more participating wireless devices to initiate the training session;
   at the controller apparatus, receiving measurement data from the one or more participating wireless devices based on reception of the test transmissions from the particular wireless device during the training session; and
   determining predistortion parameters for use by the particular wireless device based on the measurement data received from the one or more participating wireless devices.

2. The method of claim 1, wherein sending commands comprises sending a transmission command to the particular wireless device to configure the particular wireless device to generate and transmit test transmissions comprising multiple symbols or sets of symbols, each symbol or set of symbols with different predistortion parameters during the training session and reception ready commands to the one or more participating wireless devices to configure the one or more participation wireless devices to receive and make measurements on the test transmissions, wherein receiving measurement data comprises receiving measurement data generated at the one or more participating wireless devices from reception of the test transmissions, and wherein determining comprises applying a cost function to the measurement data to determine predistortion parameters used during the training session that satisfy the cost function, and further comprising sending to the particular wireless device a message that identifies or contains the predistortion parameters determined to satisfy the cost function.

3. The method of claim 2, wherein sending comprises sending the transmission and the reception ready commands, during a first phase, to cause the particular wireless device to send the test transmissions on an operating channel of the particular wireless device for reception by the one or more participating wireless devices and during a second phase, to cause the particular wireless device to send the test transmissions on a channel that is adjacent to the operating channel, and wherein receiving comprises receiving error vector magnitude measurement data generated by the one or more participating wireless devices from reception of the test transmissions during the first phase and receiving adjacent channel power measurement data generated by the one or more participating wireless devices from reception of the test transmissions during the second phase.

4. The method of claim 3, wherein during the second phase, sending comprises sending the transmission commands and reception ready commands configured to cause the particular wireless device to intermittently transmit test transmissions in the operating channel and in the channel that is adjacent to the operating channel, to enable one or more participating wireless devices to generate channel estimate information of the over-the-air channel with respect to the particular wireless device to allow the participating wireless device to adjust the adjacent channel power measurement data using the channel estimate information.

5. The method of claim 4, wherein during the second phase, sending comprises sending the transmission and reception ready commands configured to cause the particular wireless device and the one or more participating wireless devices to operate in a mode whereby the particular wireless device sends a first portion of a test transmission in the operating channel and in an adjacent channel and sends a second portion of a test transmission only in the operating channel to allow the participating wireless device to adjust the adjacent channel power measurement data using the channel estimate information.

6. The method of claim 3, wherein applying the cost function comprises applying the cost function to the measurement data so as to weight the adjacent channel power measurement data and the error vector magnitude measurement data respectively depending on a distance of the adjacent channel power measurement data and the error vector magnitude measurement data to respective desired values and based on operating requirements of the particular wireless device.

7. The method of claim 3, and further comprising, during the first phase and/or second phase, sending comprises sending the transmission commands and reception ready commands configured to control the one or more participating wireless devices to generate channel estimate information based on one or more transmissions sent by the particular wireless device, and wherein determining comprises computing the predistortion parameters so as to remove effects of channel fading conditions of the over-the-air channel.

8. The method of claim 2, and further comprising, at the controller, determining whether to initiate a fast tuning procedure or a full training procedure during the training session, wherein for the fast tuning procedure, sending commands comprises sending commands from the controller to the particular wireless device to configure the particular wireless device to send the test transmissions with predistortion coefficients currently used by the particular wireless device and with a plurality of scaling factors applied to a baseband signal that is supplied as input to a predistortion module in the particular wireless device, such that the particular wireless device transmits each symbol or set of symbols with a different scaling factor, and wherein determining comprises determining one of the plurality of scaling factors that satisfies the cost function, and wherein for a full training procedure, sending commands comprises sending commands from the controller to the particular wireless device to configure the particular wireless device to send the test transmissions with a plurality of different predistortion weights used by the predistortion module in the particular wireless device, such that the particular wireless device transmits each symbol or set of symbols with different predistortion weights, and wherein determining comprises determining one of the plurality of predistortion weights that satisfies the cost function.

9. The method of claim 8, wherein for the fast tuning procedure, determining comprises determining whether any of the plurality of scaling factors is sufficient and if not, sending comprises sending commands to the particular wireless device and to the one or more participating wireless devices for another training session with a different plurality of scaling factors, and for the full training procedure, determining comprises determining whether any of the plurality of predistortion coefficients are sufficient and if not, sending comprises sending commands to the particular wireless device and to the one or more participating wireless devices for another training session with a different plurality of predistortion coefficients.

10. The method of claim 2, wherein applying the cost function comprises applying the cost function to the measurement data according to one or more performance criteria of the particular wireless device, the performance criteria comprises one or more selected from the group of: target transmit data rate, regulatory requirements, operating channel requirements and transmit power.

11. The method of claim 2, wherein applying the cost function comprises applying the cost function according to a polynomial order and memory length for memory polynomial predistortion used in the particular wireless device.

12. The method of claim 1, wherein identifying one or more participating wireless devices comprises sending a transmission command to one or more wireless devices within a proximity to the particular wireless device, the transmission command configured to cause the one or more participating wireless devices to send a plurality of transmissions to enable the particular wireless device to measure receive signal strength and coherence time with respect reception of the plurality of transmissions, receiving receive signal strength data and coherence time data from the particular wireless device, prioritizing wireless devices to be a participating wireless device according to coherence time and selecting one or more of the wireless devices to be the one or more participating wireless device based on coherence time.

13. The method of claim 1, and further comprising at the particular wireless device, determining a target transmit power to be used at the particular wireless device for a transmission, determining whether the predistortion parameters are for the target transmit power, and when it is determined that the predistortion parameters are not for the target transmit power but are for a transmit power that is within a predetermined range of the target transmit power, further comprising applying a scaling factor to a baseband signal that is supplied as input to a predistortion module in the particular wireless device so that the predistortion module predistorts the baseband signal using the predistortion parameters after it has been scaled by the scaling factor.

14. An apparatus comprising:
a network interface device configured to enable communications over a network to communicate with a plurality of wireless devices configured for wireless communication;
a processor configured to:
identify a particular wireless device of the plurality of wireless devices that requires adjustment of predistortion parameters used by the particular wireless device when transmitting a signal;
identify one or more participating wireless devices to participate in a training session during which the particular wireless device makes test transmissions and the one or more participating wireless devices make measurements based on reception of the test transmissions sent by the particular wireless device;

send commands to the particular wireless device and to the one or more participating wireless devices to initiate the training session;

receive measurement data from the one or more participating wireless devices based on reception of the test transmissions from the particular wireless device during the training session; and determine predistortion parameters for use by the particular wireless device based on the measurement data received from the one or more participating wireless devices.

15. The apparatus of claim 14, wherein the processor is configured to send a transmission command to the particular wireless device to configure the particular wireless device to generate and transmit test transmissions comprising multiple symbols or sets of symbols, each symbol or set of symbols with different predistortion parameters during the training session and to send reception ready commands to the one or more participating wireless devices to configure the one or more participation wireless devices to receive and make measurements on the test transmissions, to receive measurement data generated at the one or more participating wireless devices from reception of the test transmissions, to apply a cost function to the measurement data to determine predistortion parameters used during the training session that satisfies the cost function, and to send to the particular wireless device a message that identifies or contains the predistortion parameters determined to satisfy the cost function.

16. The apparatus of claim 15, wherein the processor is configured to send the transmission and the reception ready commands, during a first phase, to cause the particular wireless device to send the test transmissions on an operating channel of the particular wireless device for reception by the one or more participating wireless devices and during a second phase, to cause the particular wireless device to send the test transmissions on a channel that is adjacent to the operating channel, and to receive error vector magnitude measurement data generated by the one or more participating wireless devices from reception of the test transmissions during the first phase and to receive adjacent channel power measurement data generated by the one or more participating wireless devices from reception of the test transmissions during the second phase.

17. The apparatus of claim 16, wherein the processor is configured to apply the cost function to the measurement data so as to weight the adjacent channel power measurement data and the error vector magnitude measurement data depending on a distance of the adjacent channel power measurement data and the error vector magnitude measurement data to respective desired values and based on operating requirements of the particular wireless device.

18. The apparatus of claim 16, wherein the processor is further configured to initiate a fast tuning procedure or a full training procedure during the training session, and wherein for the fast tuning procedure, the processor is configured to send commands to the particular wireless device to configure the particular wireless device to send the test transmissions with predistortion coefficients currently used by the particular wireless device and with a plurality of scaling factors applied to a baseband signal that is supplied as input to a predistortion module in the particular wireless device, such that the particular wireless device transmits each symbol or set of symbols with a different scaling factor, and wherein the processor is configured to determine one of the plurality of scaling factors that satisfies the cost function, and wherein for a full training procedure, the processor is configures to send commands to the particular wireless device to configure the particular wireless device to send the test transmissions with a plurality of different predistortion weights used by the predistortion module in the particular wireless device, such that the particular wireless device transmits each symbol or set of symbols with different predistortion weights, and the processor is configured to determine one of the plurality of predistortion weights that satisfies the cost function.

19. The apparatus of claim 18, wherein the processor is configured to apply the cost function according to a polynomial order and memory length for memory polynomial predistortion used in the particular wireless device.

20. A system comprising the apparatus of claim 14, and further comprising the plurality of wireless devices, each wireless device comprising a baseband signal generator that is configured to generate a baseband transmit signal, a digital predistorter module that is configured to predistort the baseband transmit signal according to the predistortion parameters to output a predistorted baseband transmit signal, an upconverter that is configured to upconvert the predistorted baseband transmit signal and a power amplifier that is configured to amplify the upconverted predistorted baseband transmit signal for transmission via an antenna, and a processor configured to process commands received from the apparatus so as to serve as the particular wireless device to be trained or a participating wireless device during the training session.

21. A wireless communication device comprising:
a baseband signal generator that is configured to generate a baseband transmit signal;
a digital predistorter module that is configured to predistort the baseband transmit signal according to predistortion parameters to output a predistorted baseband transmit signal;
an upconverter that is configured to upconvert the predistorted baseband transmit signal to produce an upconverted predistorted baseband transmit signal;
a power amplifier that is configured to amplify the upconverted predistorted baseband transmit signal for transmission via an antenna;
a network interface device configured to enable communications over a network; and
a processor configured to process commands received via the network from a controller so as to train the predistortion parameters used by the digital predistortion module during a training session initiated by the controller or to participate and make measurements with respect to another wireless communication device during a training session.

22. The wireless communication device of claim 21, and further comprising a downconverter configured to downconvert a receive signal from the antenna to produce a baseband receive signal, and a baseband receive signal processor configured to process the baseband receive signal, wherein the processor is configured to generate measurement data with respect to reception of test transmissions sent by another wireless communication device during the training session.

23. The wireless communication device of claim 22, wherein the processor is configured to generate error vector magnitude measurement data with respect to reception of test transmissions during a phase first and to generate adjacent channel power measurement data with respect to reception of test transmissions on an operating channel of another wireless communication device and on a channel adjacent to the operating channel.

24. The wireless communication device of claim 21, wherein the processor is responsive to a transmission command received for a training session during which the predistortion parameters are trained, to generate test transmissions comprising multiple symbols or sets of symbols, each symbol or set of symbols to be transmitted with different predistortion parameters during the training session.

25. The wireless communication device of claim 24, wherein the processor is configured to generate test transmissions to be intermittently transmitted in the operating channel and in an adjacent channel to enable one or more participating wireless devices to generate channel estimate information of the over-the-air channel with respect to the particular wireless device to allow the participating wireless device to adjust the adjacent channel power measurement data using the channel estimate information.

* * * * *